(12) United States Patent
Norgate (10) Patent No.: US 12,468,831 B2
(45) Date of Patent: Nov. 11, 2025

(54) BACKUP DATA SECURITY MANAGEMENT SYSTEM AND ASSOCIATED METHOD

(71) Applicant: Predatar Limited, Banbury (GB)

(72) Inventor: Richard Norgate, Banbury (GB)

(73) Assignee: Predatar Limited, Bloxham (GB)

( * ) Notice: Subject to any disclaimer, the term of this patent is extended or adjusted under 35 U.S.C. 154(b) by 71 days.

(21) Appl. No.: 18/160,361

(22) Filed: Jan. 27, 2023

(65) Prior Publication Data

US 2023/0244805 A1    Aug. 3, 2023

Related U.S. Application Data

(60) Provisional application No. 63/304,885, filed on Jan. 31, 2022.

(51) Int. Cl.
*G06F 21/62* (2013.01)
*G06F 3/0482* (2013.01)

(52) U.S. Cl.
CPC ........ *G06F 21/6218* (2013.01); *G06F 3/0482* (2013.01)

(58) Field of Classification Search
CPC ............................ G06F 21/6218; G06F 3/0482
See application file for complete search history.

(56) References Cited

U.S. PATENT DOCUMENTS

| | | | | |
|---|---|---|---|---|
| 8,176,526 | B1 * | 5/2012 | Yang | G06F 11/2005 726/1 |
| 9,864,659 | B2 * | 1/2018 | Roehrsheim | G06F 16/113 |
| 10,783,043 | B2 * | 9/2020 | O'Mahony | G06F 21/565 |
| 11,080,147 | B2 * | 8/2021 | Haustein | G06F 11/1451 |
| 11,636,207 | B2 * | 4/2023 | Spurlock | G06F 11/302 726/24 |
| 2013/0166521 | A1 * | 6/2013 | Ghatty | G06F 11/1469 707/E17.005 |
| 2016/0092308 | A1 * | 3/2016 | Bates | G06F 11/1092 714/4.11 |
| 2017/0223031 | A1 * | 8/2017 | Gu | G06F 11/1448 |
| 2020/0236121 | A1 * | 7/2020 | Spurlock | G06F 21/566 |
| 2021/0390495 | A1 * | 12/2021 | Upadhyay | G06F 9/5016 |
| 2024/0037224 | A1 * | 2/2024 | Norgate | G06F 21/552 |

FOREIGN PATENT DOCUMENTS

| | | | | |
|---|---|---|---|---|
| CA | 3019911 | A1 * | 2/2017 | ......... H04L 63/1433 |
| WO | 2020/142245 | A1 | 7/2020 | |

OTHER PUBLICATIONS

International Search Report and Written Opinion for PCT/GB2023/050198 mailed Apr. 12, 2023, 11 pages.

* cited by examiner

*Primary Examiner* — Dhairya A Patel
(74) *Attorney, Agent, or Firm* — Kilpatrick Townsend & Stockton LLP (57) ABSTRACT

The disclosure relates to a computer implemented method for assisting a user managing the data-security of backup copies of a computer system having a plurality of nodes, the method comprising: receiving status data for backup copies associated with a plurality of nodes, wherein, for each node, the status data provides a status of one or more backup copies associated with the node with respect to a plurality of data-security criteria; determining a backup security metric for each of the plurality of nodes based on the status data; and providing the security metrics for the user to demonstrate the relative level of backup data-security of the plurality of nodes.

11 Claims, 7 Drawing Sheets

Step 1: Score each node on the elements below

| 90 day avg Backup success rate | 100-90 | 89-75 | 74-50 | 50-0 |
|---|---|---|---|---|
| | 10 | 7 | 5 | 0 |

| Latest Backup Status | Success | Success with Missed |
|---|---|---|
| | 5 | 2 | 0 |

| | Yes | No |
|---|---|---|
| Immutable Backups | 8 | 0 |
| Encrypted | 8 | 0 |
| Air Gapped | 8 | 0 |
| 3rd Copy | 6 | 0 |

| | Last 7 days | Last 2 weeks | Last 4 weeks | Last 8 weeks | Last 12 week | Last 24 week | Last 48 week | Over than 48 | Never |
|---|---|---|---|---|---|---|---|---|---|
| Data last Recovered | 10 | 9 | 8 | 7 | 6 | 4 | 2 | 1 | 0 |
| Date last AV Scanned | 10 | 9 | 8 | 7 | 6 | 4 | 2 | 1 | 0 |

Step 2: Add up the score for each node and then assign a grade as below

| Grades | Max Score | Min Score |
|---|---|---|
| A+ | 65 | 62 |
| A | 61 | 57 |
| A- | 56 | 53 |
| B+ | 52 | 48 |
| B | 47 | 44 |
| B- | 43 | 41 |
| C+ | 40 | 39 |
| C | 38 | 36 |
| C- | 35 | 33 |
| D+ | 32 | 31 |
| D | 30 | 27 |
| D- | 26 | 25 |
| E+ | 24 | 22 |
| E | 21 | 19 |
| E- | 18 | 11 |
| F | 10 | 0 |

Step 3: Score each node and then work out average grade across all nodes to show overall score

BACKUP DATA SECURITY MANAGEMENT SYSTEM AND ASSOCIATED METHOD

CROSS REFERENCE TO RELATED APPLICATIONS

This application claims priority to U.S. Provisional Patent Application No. 63/304,885, filed on Jan. 31, 2022, the disclosure of which is incorporated by reference in its entirety for all purposes.

FIELD

The present disclosure relates to apparatus, systems and methods for assisting a user managing the data-security of a computer system, and in particular, although not necessarily, for identifying nodes that have backup copies that require attention to avoid infiltration by malware or a ransomware attack.

BACKGROUND

Public and private organisations of all shapes and sizes rely on the reliable and secure operation of their computer networks. It is not uncommon for a particular proprietor's network to contain thousands of machines, or virtual machines, spread across the globe. The interconnectivity of these machines allows collaboration but also increases the risk of infection by malware or ransomware, as the number of infection points increases. Ransomware can be especially problematic as it may encrypt the contents of a computer system's memory and demand that a ransom be paid by the proprietor in exchange for the decryption keys. Such infections can have devasting financial and reputational consequences for organisations and the scale of existing networks and their interconnectivity can create significant challenges in recovering from such events. Strategies for combatting ransomware attacks, and other forms of system failure, include maintain backup copies of the machines and virtual machines, which will be collectively referred to as nodes, within the computer system. A large number of backup copies can amass over time, even for computer systems of a relatively modest scale. Operational staff in IT departments currently use a number of tools in order to maintain and manage the data security of the backup copies of nodes in their network or system. For example, an antivirus package may be used in combination with encryption tools to safeguard backups. However, it can be difficult or infeasible using existing tools for the operator to gain a sense of the overall security of the backup copies associated with the various nodes in their system, based on a number of factors. Backup system maintenance can therefor be overly time consuming or ineffective. One or more aspects of the present disclosure are directed to alleviating such difficulties.

SUMMARY

According to a first aspect of the present disclosure there is provided a computer implemented method for assisting a user managing the data-security of backup copies of a computer system having a plurality of nodes, the method comprising:

receiving status data for backup copies associated with a plurality of nodes, wherein, for each node, the status data provides a status of one or more backup copies associated with the node with respect to a plurality of data-security criteria;

determining a backup security metric for each of the plurality of nodes based on the status data; and providing the security metrics for the user to demonstrate the relative level of backup data-security of the plurality of nodes.

A backup copy being associated with a node may relate to the backup copy being stored at that node. Alternatively, a backup copy being associated with a node may relate to the backup copy containing data from that node.

The backup security metric for a particular node may be based on a weighted combination of numerical values of the status data associated with the particular node.

The data-security criteria may comprise one or more of, for one or more backup copies of a node: average backup success rate; latest backup status; immutable backup status; encryption status; air gapped status; $3^{rd}$ copy status; data last recovered date; and date last anti-virus scanned.

The method may further comprise determining a backup security metric for a group of nodes based on the backup security metrics of the nodes in the group.

Providing the backup security metrics may comprise providing a graphical user interface comprising a graphical element associated with each node or a group of nodes.

The graphical element for each node may be selectable to provide an indication of the status of one or more of the data-security criteria associated with respective nodes.

Each indication of the status of one or more of the data-security criteria that require action may be provide by a selectable user interface element to perform a required action.

The required action may be performed by an external software application to the graphical user interface.

According to a further aspect, there is provided a computer implemented method for assisting a user managing the data-security of a computer system having a plurality of nodes, the method comprising:

receiving node status data for a plurality of nodes, wherein for each node the node status data provides a status of the node with respect to a plurality of data-security criteria;

determining a security metric for each of the plurality of nodes based on the node status data; and providing the security metrics for the user to demonstrate the relative level of data-security of the plurality of nodes.

According to a further aspect, there is provided a computer program product including one or more sequences of one or more instructions which, when executed by one or more processors, cause an apparatus to at least perform any method disclosed herein or provide any of the graphical user interfaces described herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One or more embodiments will now be described by way of example only with reference to the accompanying drawings in which.

DETAILED DESCRIPTION

The present disclosure is directed to methods, systems and software for assisting a user managing the backup data-security of the computer system. As such, various embodiments may provide consolidated information concerning the technical state of the backups of nodes within the system and so enable the user to better maintain the data-security of the backup system. In some embodiments, an interface with various software tools for fixing or modifying the backup copies is also provided in a consolidated package.

Figure 1:
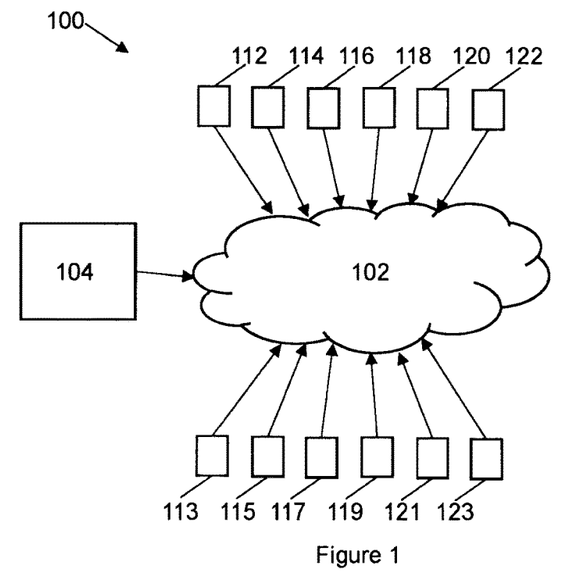
FIG. 1 illustrates a schematic block diagram for a computer system.

FIG. 1 shows a schematic block diagram for a computer system 100. The computer system 100 provides a network, which in this example is shown by a cloud network 102. The cloud network 102 is configured to enable communication between an operator device 104 and a plurality of nodes 112-123, including backup nodes. Such nodes contain backup data for restoring other nodes of the computer system. The operator device 104 may be provided for use by a system maintenance technician, who in the following examples may be considered to be a user of the system. In the above respects, the architecture of the computer system 100 may be entirely conventional. However, elements of the computer system 100, such as, for example, the operator device 104, may be used to implement a method for assisting a user managing the backup data-security of the computer system 100. In such examples, the operator device 104 may comprise at least one processor and at least one memory including computer program code for one or more programs. The at least one memory and the computer program code in such examples are configured to, with the at least one processor, cause the apparatus to perform the method for assisting the user.

Figure 2:
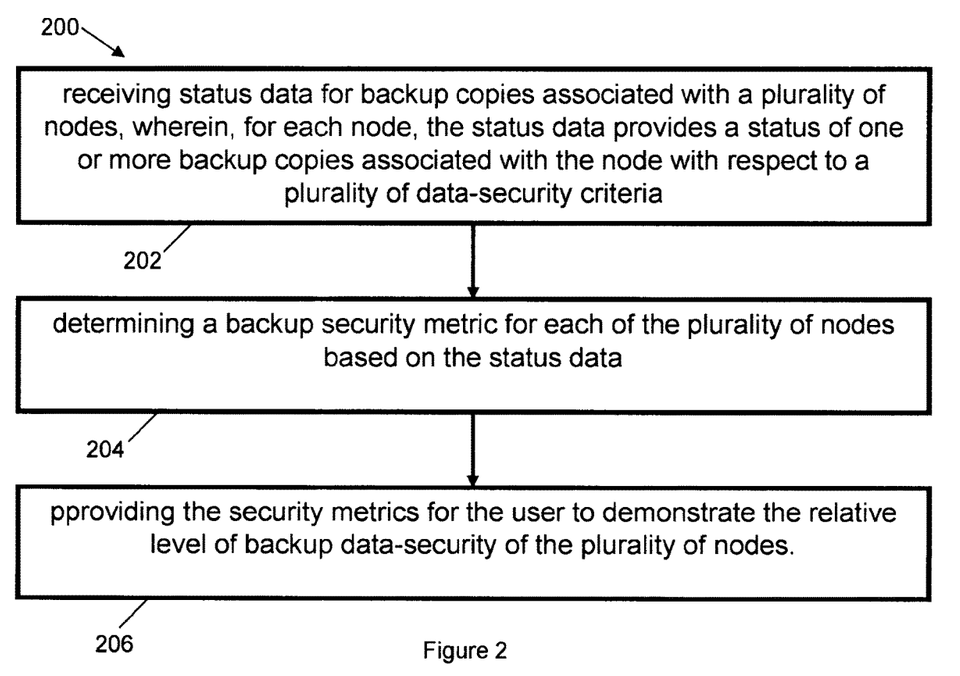
FIG. 2 illustrates a flow chart from a method for assisting a user managing the data-security of a computer system having a plurality of nodes.

FIG. 2 illustrates an example method 200 for assisting a user managing the backup data-security of a computer system having a plurality of nodes. The method 200 comprises receiving 202 status data for backup copies associated with the plurality of nodes. In a general sense, the computer system may have further nodes in addition to the plurality of nodes. That is, the method does not necessarily receive or act on backup data from every node in the computer system, although it may do so. For each node, the status data provides a status of the node with respect to a plurality of data-security criteria. The determination or generation of the status data may be achieved using conventional means and is not the focus of the present application or the subject of the method.

A backup security metric is determined 204 for each of the plurality of nodes based on the status data for the backup data associated with that respective node. That is, status data associated with various data-security criteria for backup copies associated with a particular node may be combined to provide a backup security metric for that node. The backup security metrics are provided 206 for the user to demonstrate the relative level of backup data-security of each of the plurality of nodes in the system. By presenting information characterising the internal state of the system, the method provides a tool for assisting a user managing the backup data security of a computer system. In particular, by providing a relative score for the backup data security of the different nodes, the method allows the work of improving the backup data security to be more effectively managed by enabling the user to concentrate time and resources on the most pressing tasks while giving a more holistic representation of the backup state of the system with respect to a number of different security criteria.

In a general sense, the method generates a score of each node backup and may show the grade for that node. The higher the grade, the better chance of that data being recoverable in a disaster such as a cyber-attack.

Figures 3, 5:
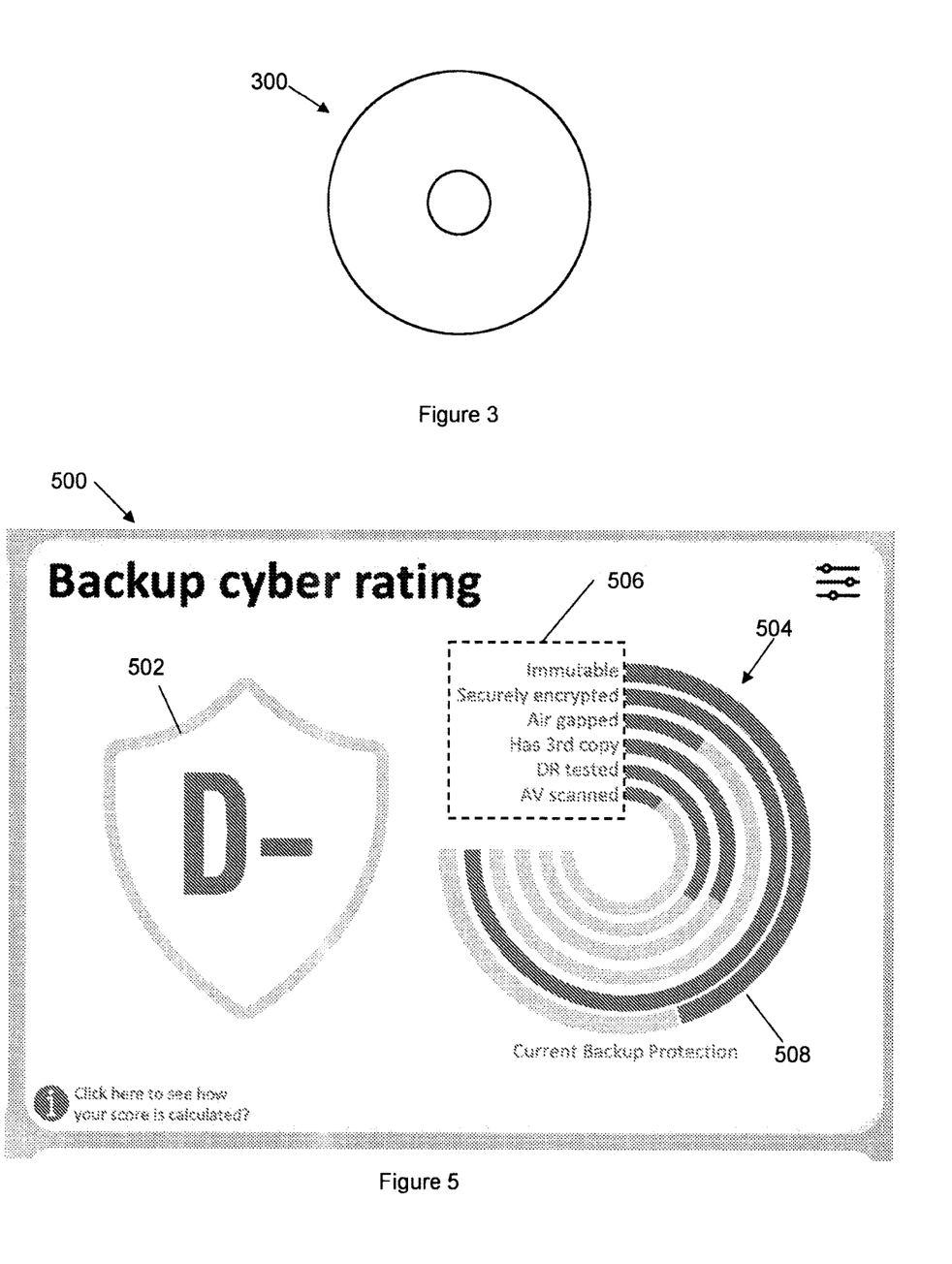
FIG. 3 illustrates an example computer program product.
FIG. 5 illustrates a graphical representation for providing a data-security score for a node.

FIG. 3 shows an example computer program product 300 (equivalent to a computer readable memory medium) that contains instructions that, when executed, cause a system, for example described previously in relation to FIG. 1, to at least perform steps of any of the methods described herein, such as that described previously with reference to FIG. 2.

Various aspects of implementations of the method of FIG. 2 are described below with reference to FIGS. 4 to 11. As will be discussed be discussed with reference to the specific examples, a computer program may be provided to orchestrate the fixing of issues with backup copies. The computer program may do this by making calls to the backup platform, or different external computer software packages, to complete tasks. However, the computer program can take multiple tasks that can be performed in the backup product, some of which are very complicated to do, and reduces them down to 1 click options with no need for any technical skills, as will be understood from the discussion below.

Figure 4:
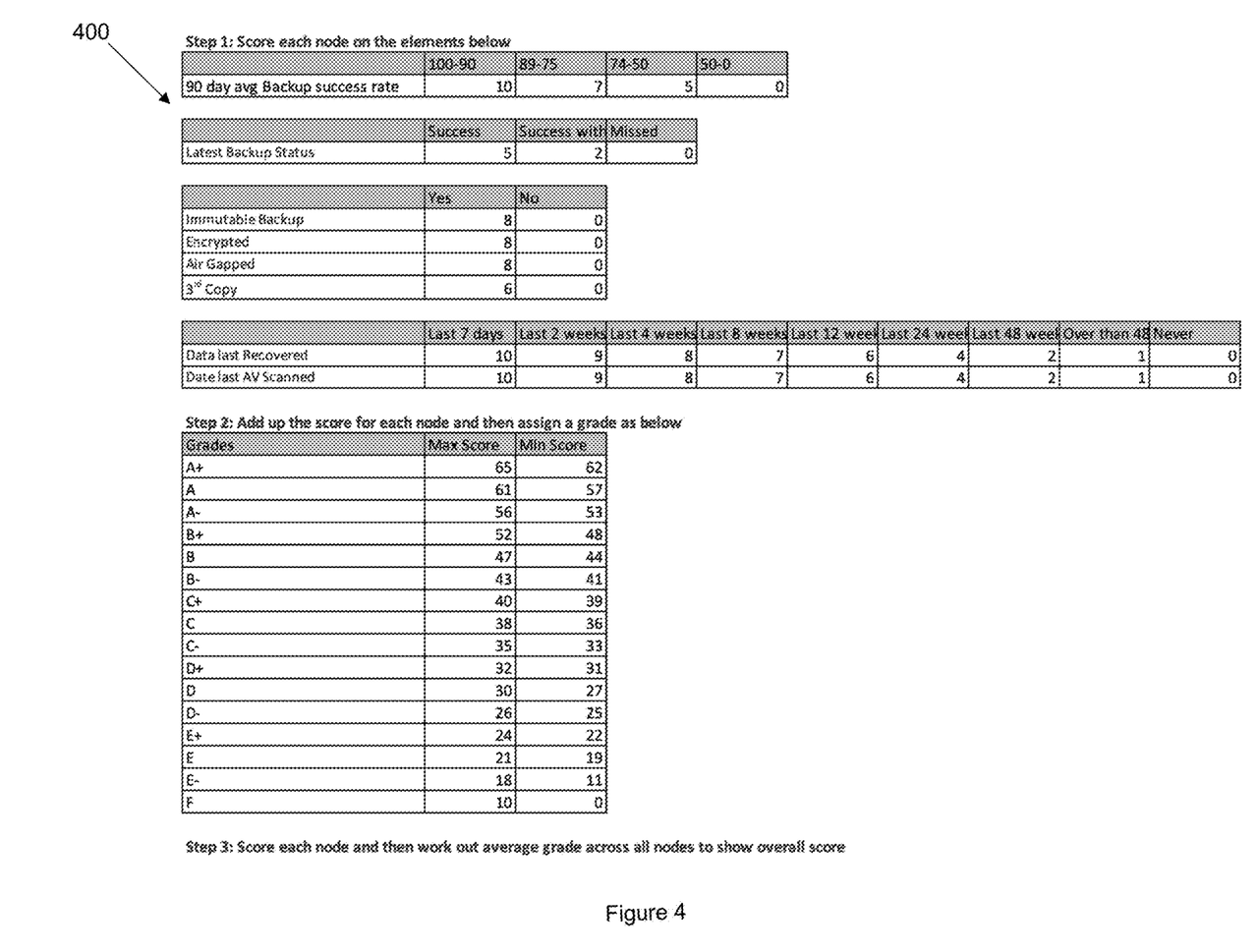
FIG. 4 illustrates a data-security scoring method.

FIG. 4 illustrates steps of a backup data-security scoring method. In a first step, status data are obtained for backup copies associated with each node of interest on a computer network. The status data relate to the statuses of corresponding backup data-security criteria. Each status for a backup data-security criterion may be represented by a numerical value.

The backup data-security criteria in the illustrated example include:

--- average backup success rate (e.g. over the previous 90 day) [%]
latest backup status [e.g. success; partial success; missed]
immutable backup status [yes; no]

```
encryption status [yes; no]
air gapped [yes; no]
3rd copy [yes; no]
data last recovered [last week; last two weeks; last four
  weeks; last eight weeks; last twelve weeks;
  last twenty four weeks; last forty eight weeks]
date last anti-virus scanned [last week; last two weeks;
  last four weeks; last eight weeks; last twelve weeks;
  last twenty four weeks; last forty eight weeks]
number of anomalies found in last 90 days for that node [number]
backup client version [version number or dare]
nodes operating system [system name/version]
node type [Virtual, physical etc. . .]
backup client version [version number or date]
```

An immutable backup file is a backup file that has been marked such that it may not be altered. An immutable backup may be held on a separate server, such as a cloud server, for example. An air gapped node is a node that is not physically connected to an external network. As such, air gapped nodes are more secure because physically tampering with the node is required in order to introduce new code, as opposed to being able to introduce code remotely via a network connection. Encrypted nodes are typically more secure than non-encrypted nodes. The security implications of the times and state are last recovered, the date that an antivirus scan was last performed, the latest backup status and the average backup success rate will be immediately apparent to those skilled in the art. For each data security criterion, a weighting value is attributed to each of the possible states of the criterion. Example weighting values are given in the first step shown in FIG. 4.

In a second step, for each node, the backup security metric for that particular node is provided as a single, combined metric produced by performing a summation of the weighted values associated with the statuses of the security criteria for that node. In this example, the backup security metric for a particular node is based on a weighted combination of the numerical values of the status of the data-security criteria associated with the particular node.

The score, or backup security metric, that is determined for a node may be associated with a corresponding security grade. In FIG. 4, various grades, or ratings, from A+ to F are associated with corresponding minimum and maximum score values. In this way, the correspondence between a particular score and an associated grade/rating may be determined.

In a third step, an overall score, or combined backup security metric, for all the nodes in the computer system, or for a group of nodes in the computer system, may be based on the respective scores of all the nodes, or the group of nodes. In particular, the backup security metric for a group of nodes may be taken as an average value of the backup security metric for that group of nodes, or may be associated with the lowest value of the backup security metric determined within that group of nodes, for example.

FIG. 5 illustrates a graphical representation 500 that may be generated to provide a backup cyber rating. The backup cyber rating may be associated with a node or a group of nodes, for example.

The graphical representation 500 comprises a first graphical element 502 providing an illustration of the grade/rating associated with the node or node group. In a general sense, the indication may be provided by colour-coding the element according to its status, may be provided as a numerical indication (e.g. marks out of 10 or 100) or graded using letter codes (e.g. from A to F).

The graphical representation 500 further comprises a second graphical element 504. The second graphical element 504 comprises a series of labels 506 and associated graphical sub-elements 508. Each of the graphical sub-elements 508 provides an indication of a status of an data security criterion associated with that sub-element. Each of the sub-elements 508 may provide a selectable user interface element that is configured to trigger an action associated with the corresponding data security criterion. For example, clicking on the sub-element 508 associated with the "AV scanned" data security criterion may cause an antivirus scan of the back-up copies associated with the node to be undertaken.

Figure 6:
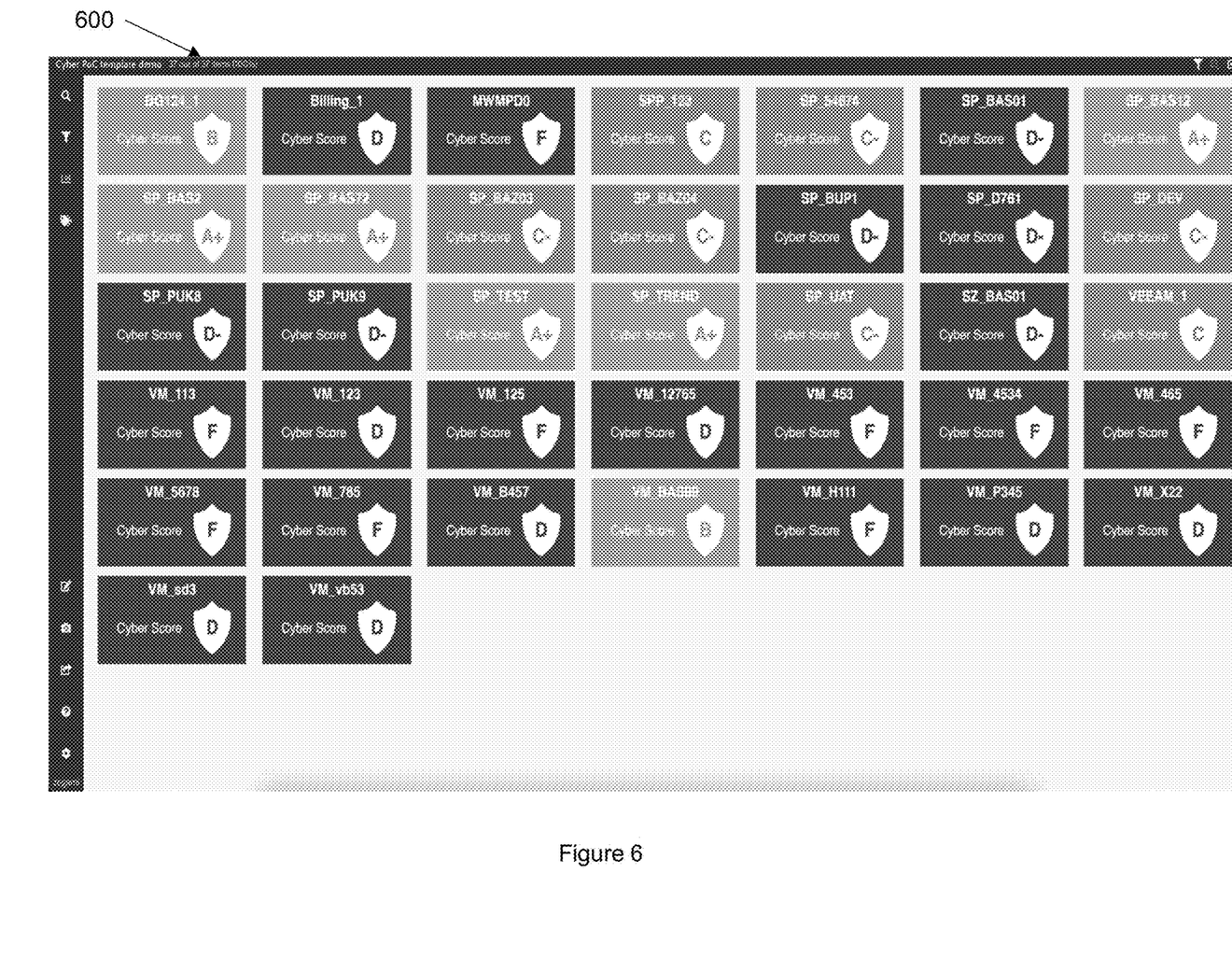
FIG. 6 illustrates a graphical user interface comprising a plurality of graphical elements associated with a respective nodes.

FIG. 6 illustrates a graphical user interface 600 comprising a plurality of graphical elements associated with a respective node of a computer system. The plurality of graphical elements may be arranged in a grid, as shown. Such an arrangement allows the presentation of the backup security metrics for the plurality of nodes to be presented in a single user interface display. In this example, each graphical element includes a label for a node and a representation of a backup security metric associated with the node. Alternatively, one or more of the graphical elements may be associated with a group of nodes of the computer system.

One or more of the nodes may provide selectable elements which, when selected, navigates the graphical user interface to a different graphical user interface, in which further details regarding the selected node are provided.

Figure 7:
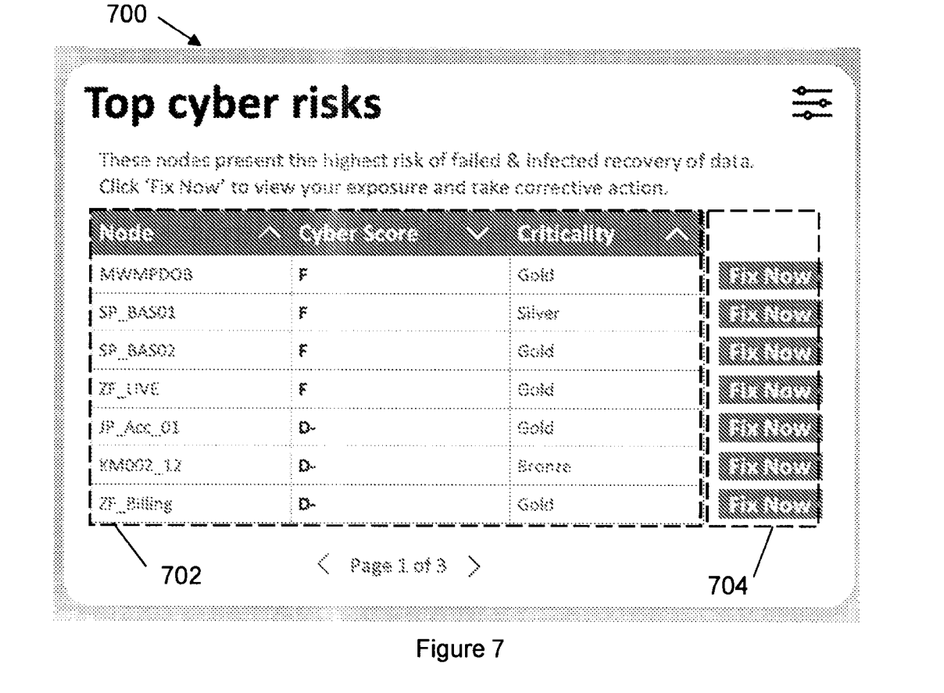
FIG. 7 illustrates another graphical user interface comprising a plurality of graphical elements associated with respective nodes.

FIG. 7 illustrates another graphical user interface 700 comprising a plurality of graphical elements associated with respective nodes of a computer system. In the graphical user interface 700, a subset of the nodes that present the highest risk of failed and infected recovery of data are displayed. Each graphical element provides a label for the associated node and a backup security metric of that node in an information panel 702. An action panel 704 is associated with the information panel 702 such that an selectable action element is positioned adjacent to information for a respective node. In this example, the selectable action elements (labelled "fix now") enable the user to initiate a software function to fix one or more security failings of the node. The software function may be an external call from the software application, such as to an external, third party antivirus program, for example.

Figure 8:
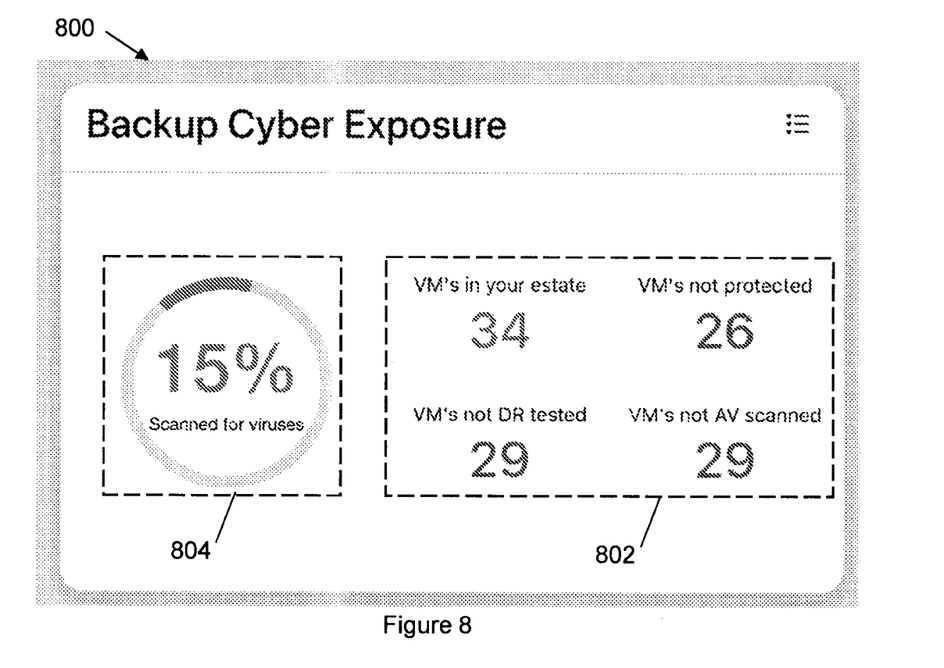
FIG. 8 illustrates another graphical user interface providing summary data regarding the backup status of a plurality of nodes

FIG. 8 illustrates another graphical user interface 800 providing summary data regarding the backup exposure of a plurality of nodes of a computer system. The graphical user interface 800 comprises a first panel 802 providing numerical data regarding backup operations of the computer system. In this example, first panel 802 provides an indication of a number of virtual machines in the computer system, the number of virtual machines that are not protected, the number of virtual machines that are not disaster recovery tested and the number of virtual machines that have not been antivirus scanned. The graphical user interface 800 further comprises a second panel 804 providing a graphical representation regarding a state of the computer system. In this example, a graphic and a printed numeric value illustrate the percentage of virtual machines in the computer system that have been scanned for viruses.

Figure 9:
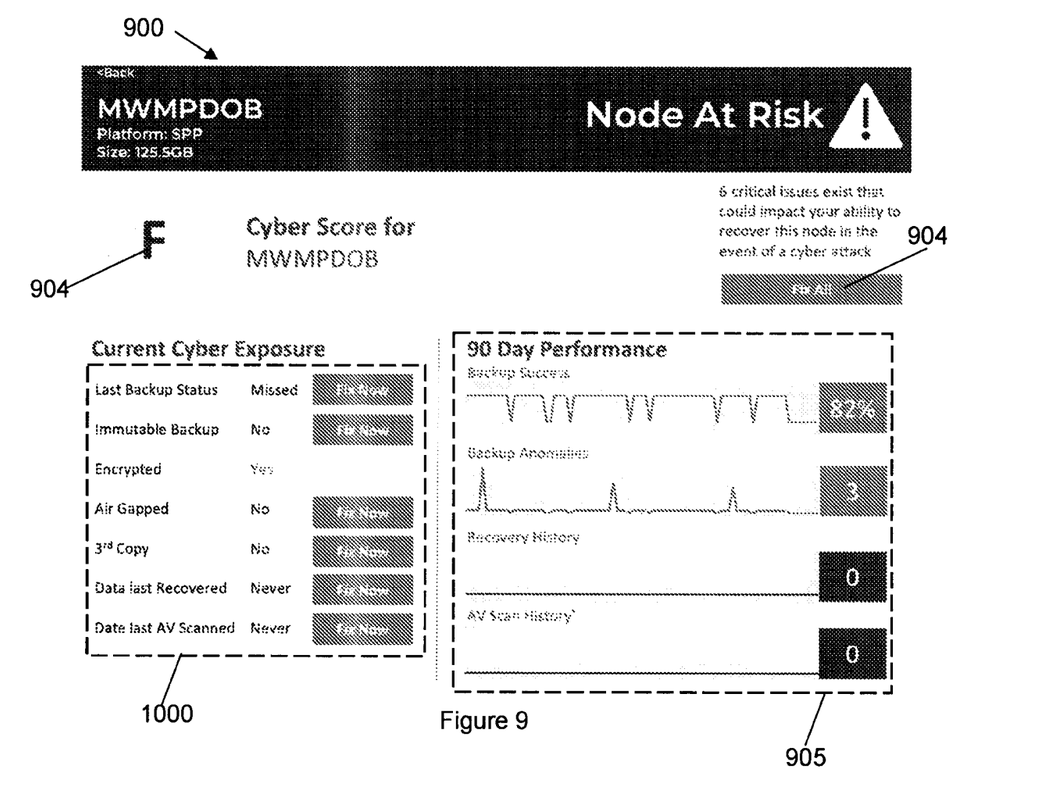
FIG. 9 illustrates a further graphical user interface providing information concerning a node.

FIG. 9 illustrates a further graphical user interface 900 providing information concerning a node of a computer system. The graphical user interface 900 may be generated in response to the selection of one of the nodes in the graphical user interface of FIG. 5, for example.

The graphical user interface 900 comprises a first portion 1000 providing information regarding current exposure, which is described further below with reference to FIG. 10, a second portion 905 providing graphical information regarding performance over time and a backup rating 904, which is similar to that described previously with reference to FIG. 5. The graphical user interface 900 further comprises a "fix all" selectable action element which is similar to that described previously with reference to FIG. 7.

The second portion 905 providing an indication of performance over time in this example provides a period of data (90 days) with graphs showing, for the node: the backup successes, backup anomalies, recovery history and number of antivirus scans.

Figure 10:
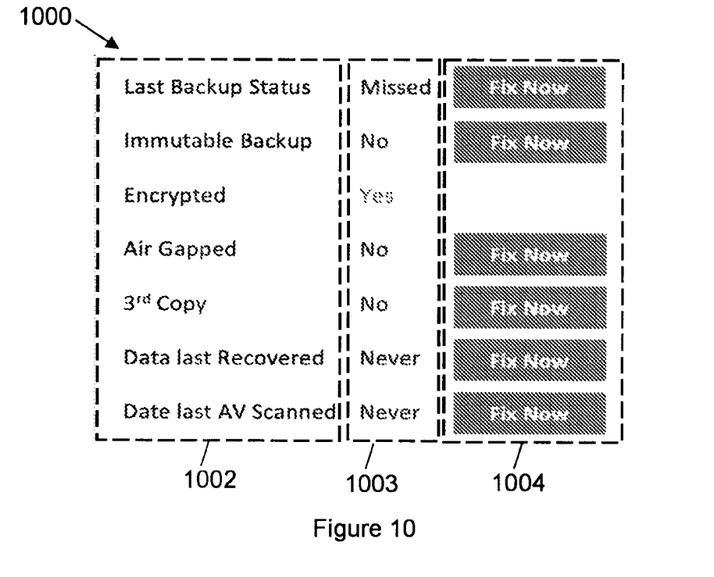
FIG. 10 illustrates the first portion of the graphical user interface of FIG. 9.

FIG. 10 further illustrates the first portion 1000 of the graphical user interface shown in FIG. 9. The first portion 1000 comprises a list of security criteria 1002 for the node, together with a summary 1003 of their status and an associated selectable action element 1004, where applicable. The security criteria listed in the first panel 1000 were described previously with reference to FIG. 4.

Figure 11:
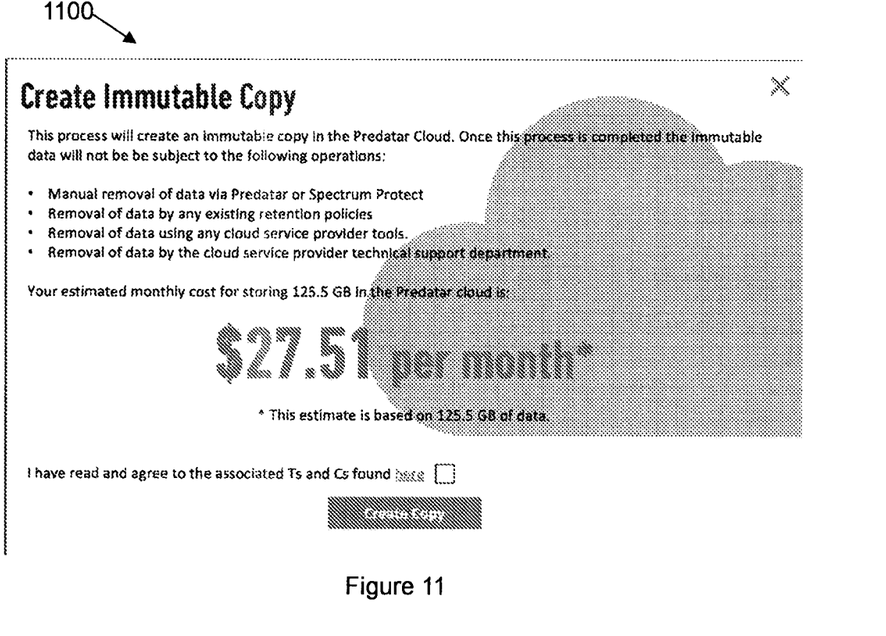
FIG. 11 illustrates an example of a graphical user interface providing a confirmation screen.

FIG. 11 illustrates a graphical user interface 1100 which may be generated in response to the user selecting the selectable action element associated with the selectable backup feature in the graphical user interface described previously with reference to FIGS. 9 and 10. The graphical user interface 1100 is an example of the type of interface that may be generated as a confirmation screen before the software implementing the management of the node caused specific third-party or external functions that allow particular node management tasks, such as the creation of immutable copy or the execution of an antivirus function on the node, to be performed.

It will be appreciated that some aspects of the method may find application in a wider context, such as the management of primary nodes in a computer system, for example.

The invention claimed is:

1. A computer implemented method for assisting a user managing a data-security of backup copies of a computer system having a plurality of nodes, the method comprising:
  receiving status data for backup copies associated with a plurality of nodes, wherein, for each node, the status data provides a status of one or more backup copies associated with the node with respect to a plurality of backup-data-security criteria;
  determining a backup security score for each of the plurality of nodes based on the status data, wherein the backup security score for each node is a single combined score for that node providing an indication of a likelihood of a data of said node being recoverable and is based on a weighted combination of numerical values of the statuses of the plurality of backup-data-security criteria associated with that particular node; and
  providing an indication of the backup security score of each of the plurality of nodes for display to the user to demonstrate a relative level of backup data-security of each of the plurality of nodes.

2. The method of claim 1, wherein the backup-data-security criteria comprise one or more of, for one or more backup copies of a node:
  immutable backup status;
  air gapped status; and
  $3^{rd}$ copy status.

3. The method of claim 1, further comprising determining a backup security score for a group of nodes based on the backup security scores of the nodes in the group.

4. The method of claim 1, wherein providing the backup security scores comprises providing a graphical user interface comprising a graphical element associated with each node or a group of nodes.

5. The method of claim 4, wherein the graphical element for each node is selectable to provide an indication of the status of one or more of the backup copy data-security criteria associated with respective nodes.

6. The method of claim 5, wherein each indication of the status of one or more of the backup copy data-security criteria that require action are provide by a selectable user interface element to perform a required action.

7. The method of claim 6, wherein the required action is performed by an external software application to the graphical user interface.

8. The method of claim 1, wherein the backup-data-security criteria comprise one or more of, for one or more backup copies of a node:
  average backup success rate;
  data last recovered date; and
  date last anti-virus scanned.

9. The method of claim 1, further comprising generating a grade for each node based on the backup security score for said node, wherein providing the indication comprises comparing the backup security score for said node to a plurality of grading thresholds to determine a corresponding grading.

10. An apparatus comprising:
  at least one processor; and
  at least one memory including computer program code for one or more programs,
  the at least one memory and the computer program code configured to, with the at least one processor, cause the apparatus to perform the method of claim 1.

11. A computer program product including one or more sequences of one or more instructions which, when executed by one or more processors, cause an apparatus to at least perform the method of claim 1.

* * * * *